March 4, 1952 R. CONNOR ET AL 2,588,087

METHOD AND APPARATUS FOR MOUNTING FILM ON CARDS

Filed Dec. 28, 1948 4 Sheets-Sheet 1

INVENTORS
Roger Connor & Hunter E. Hooe
BY
Mellin and Hancom
ATTORNEYS

METHOD AND APPARATUS FOR MOUNTING FILM ON CARDS

Filed Dec. 28, 1948 4 Sheets-Sheet 2

INVENTORS
Roger Connor & Hunter E. Hooe
BY
Mellin and Hanscom
ATTORNEYS

March 4, 1952 R. CONNOR ET AL 2,588,087

METHOD AND APPARATUS FOR MOUNTING FILM ON CARDS

Filed Dec. 28, 1948 4 Sheets-Sheet 3

INVENTORS
Roger Connor & Hunter E. Hooe
BY
Mellin and Hanscom
ATTORNEYS

March 4, 1952 R. CONNOR ET AL 2,588,087

METHOD AND APPARATUS FOR MOUNTING FILM ON CARDS

Filed Dec. 28, 1948 4 Sheets-Sheet 4

INVENTORS.
Roger Connor & Hunter E. Hooe
BY
Mellin and Hanscom
ATTORNEYS

Patented Mar. 4, 1952

2,588,087

UNITED STATES PATENT OFFICE 2,588,087

METHOD AND APPARATUS FOR MOUNTING FILM ON CARDS

Roger Connor and Hunter E. Hooe, Athens, Ohio, assignors to The McBee Company, Athens, Ohio, a corporation Application December 28, 1948, Serial No. 67,711

4 Claims. (Cl. 216—22)

This invention relates to a method and an apparatus adapted to mount microfilm exposures and the like on cards.

In the use of statistical cards and the like, it is frequently desirable to combine with the card a microfilm of a record or other information pertinent to the card. This may be accomplished by providing each card with a die-cut opening and mounting a microfilm exposure within the opening. Thus, when it is desired to read the information on the microfilm, the card may be inserted in a suitable projection apparatus for reading the microfilm.

In mounting microfilm exposures in die-cut openings in statistical cards and the like, it is a common practice to mount on one side of the card, in registry with the die-cut opening, a rectangular frame of glassine or other suitable material coated on one side (facing the card) with a pressure-sensitive adhesive. Such rectangular frame overlaps the edges of the die-cut opening, and the microfilm exposure is mounted on the overlapping portions of the frame.

In providing apparatus and method for producing articles of the character described, it is desirable that the apparatus and method be simple to operate, and it is important that the apparatus be sufficiently inexpensive to be practicable for small installations. It is also desirable that the apparatus be capable of carrying out a multiplicity of operations at a single station and in a substantially continuous manner.

It is an object of the present invention to provide apparatus and method for mounting adhesive-coated frames of glassine or the like on statistical cards in registry with die-cut openings formed in the cards.

It is a further object of the invention to provide apparatus and method for punching frames of adhesive-coated material from a strip thereof, inserting the same on a statistical card in registry with a die-cut opening, punching a microfilm exposure from a strip of film and mounting the exposure on the card, all at a single station and in a continuous manner.

These and other objects of the invention will be apparent from the ensuing description and the appended claims.

Several forms which the invention may assume are exemplified in the following description and illustrated by way of example in the accompanying drawings, in which.

Figure 3:
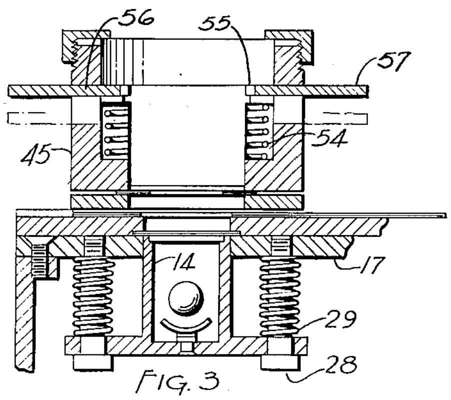
Fig. 3 is a sectional view taken along the line 3—3 of Fig. 2 showing details of the dies.

Referring now to the drawings and more particularly to Figs. 1 to 4, there is shown a film mounting apparatus generally designated as 10, comprising a housing 11 of generally right-triangular transverse cross section. Disposed within the housing 11 is a film punching and mounting mechanism generally designated as 12 and disposed above the housing is a frame punching and mounting mechanism generally designated as 13. The film punching mechanism 12 comprises a hollow die 14 having a ground-glass plate 15 forming a part of the die face, such die being slidably disposed within an opening 16 formed in a guide plate 17 mounted on the housing. The die 14 is also in precise registry with a die opening 18 formed in a die plate 19 which is disposed above the guide plate 17 so as to provide a narrow throat or passage 20 for a purpose described hereinafter. Disposed within the die 14 are an electric lamp 25 having leads 26, and a reflector 27. As shown in Fig. 3, the die 14 is slidable on studs 28 which are threaded into the guide plate 17, and compression springs 29 are provided which normally hold the die 14 in its lowermost, inactive position.

Figure 1:
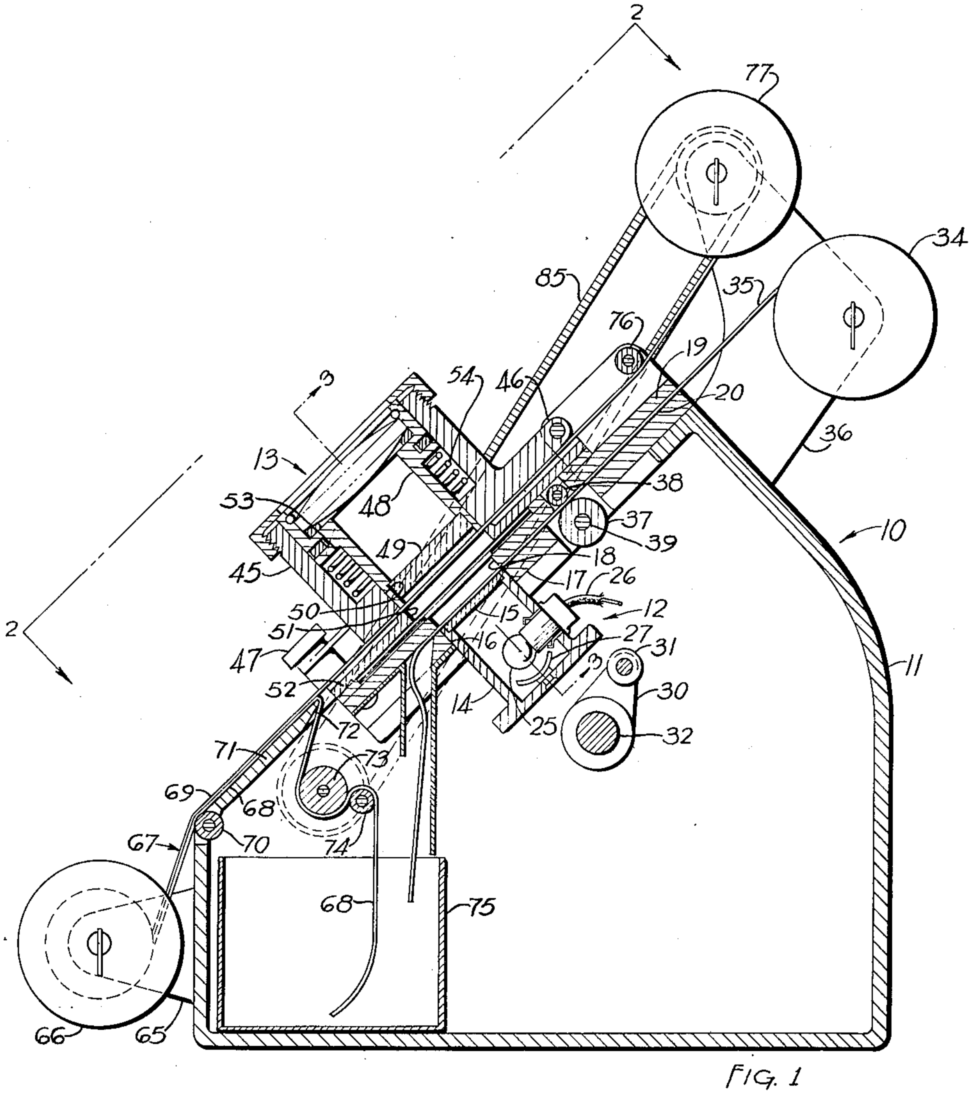
Fig. 1 is a vertical section through one form of apparatus of the invention capable of performing a multiplicity of operations.
Figure 2:
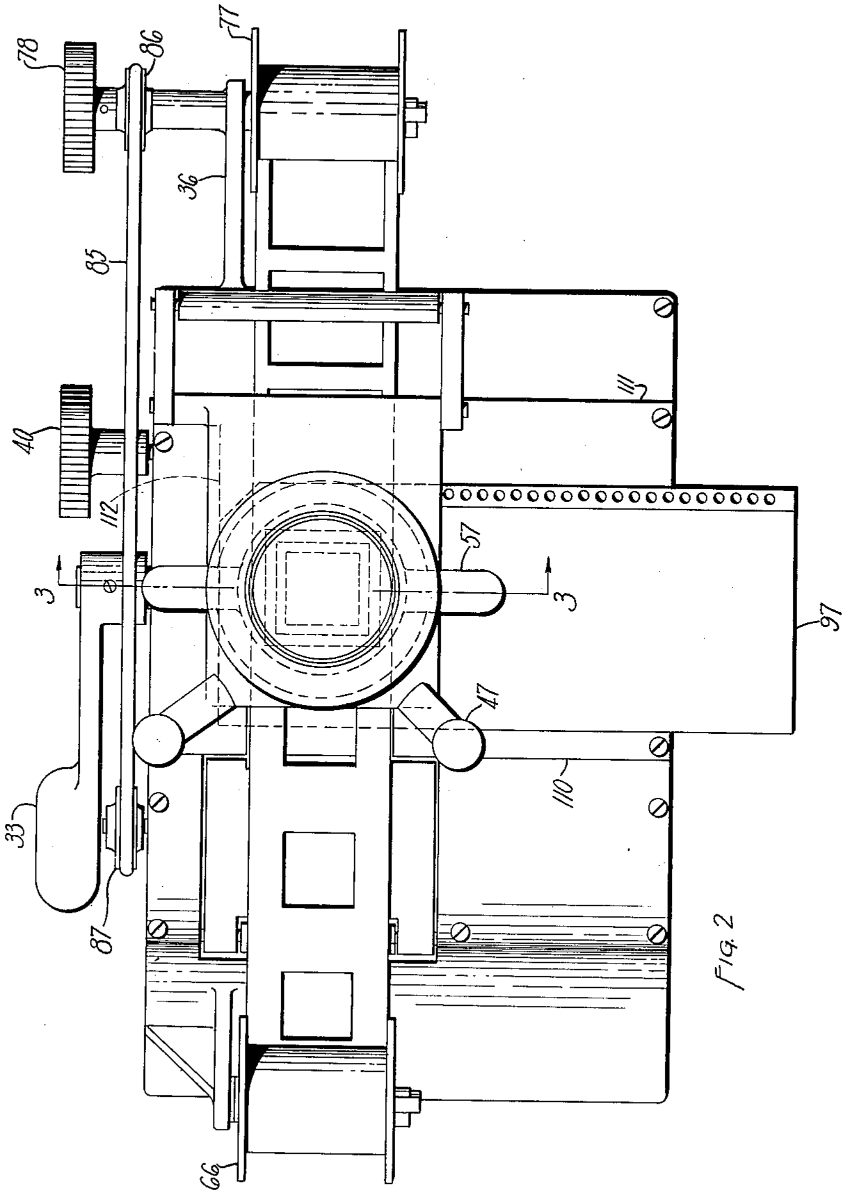
Fig. 2 is a plan view of the same as seen along the line 2—2 of Fig. 1.

The die 14 is reciprocated by means of an arm 30 having a roller 31 at its outer end and keyed to a shaft 32 which is operated by a crank or a lever 33 (see Fig. 2). A feed reel 34 for a roll of microfilm 35 is provided, being rotatably mounted upon a bracket 36 integral with the housing 11. As shown in Fig. 1, the film is threaded through the guide throat 20 and between a drive roll 37 and a squeeze roll 38. The drive roll 37 is keyed to a shaft 39 which is rotatable by means of a knob 40.

Figure 4:
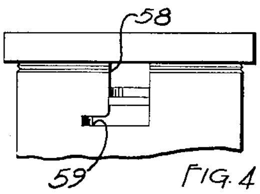
Fig. 4 is a detailed view showing the means for operating and latching one of the dies.

The frame cutting and mounting mechanism 13 comprises a housing 45 hingedly mounted on the main framework or housing 11 at 46 so that it may be swung out of the way for inspection or repairs or for threading of the film and tape. When in closed, operative position, as illustrated in Fig. 1, it is clamped in position by set screws 47. Reciprocably disposed within the housing 45 is an upper, hollow die 48 having a glass plate 49 forming a part of its face. The die 48 is reciprocable within an opening 50 formed in the housing 45 and it is in precise registry with a die opening 51 formed in an upper die plate 52. The upper die 48 is formed with a flange 53 at its upper end and it is normally held in elevated, inactive position by means of a compression spring 54 compressed between the housing 45 and flange 53. The flange 53 is provided with a peripheral groove 55 within which is received an actuator member 56 having handles 57. As shown in Fig. 4, the handles 57 extend through and are slidable in vertical slots 58 formed in the housing 45, and at the bottom of each slot 58 a horizontal slot 59 is formed for a purpose explained hereinafter.

Rotatably mounted upon a bracket 65 is a feed reel 66 for supporting a roll of laminar tape 67, the tape 67 comprising a layer of backing 68 and a layer of transparent glassine or other suitable transparent material 69 which is coated on its undersurface (i. e., facing the backing) with a pressure-sensitive adhesive. As illustrated, the tape 67 passes over a guide roll 70 and then over a stripper plate 71 having a blunt knife edge 72. The backing 68 is peeled from the glassine 69 by bending sharply over the knife edge 72 as shown in Fig. 1. The peeled backing 68 then passes between a drive roll 73 and a second guide roll 74. A waste receptacle 75 is provided for receiving the peeled backing 68. The glassine strip 69 passes between the upper die plate 52 and the housing 45, as illustrated, and under a guide roll 76, and it is taken up on a take-up reel 77, which is rotated by means of a knob 78. A flexible driving connection of known type is provided between the take-up reel 77 and the drive roll 73, by means of a spring belt 85 trained over pulleys 86 and 87.

Figures 10, 11:
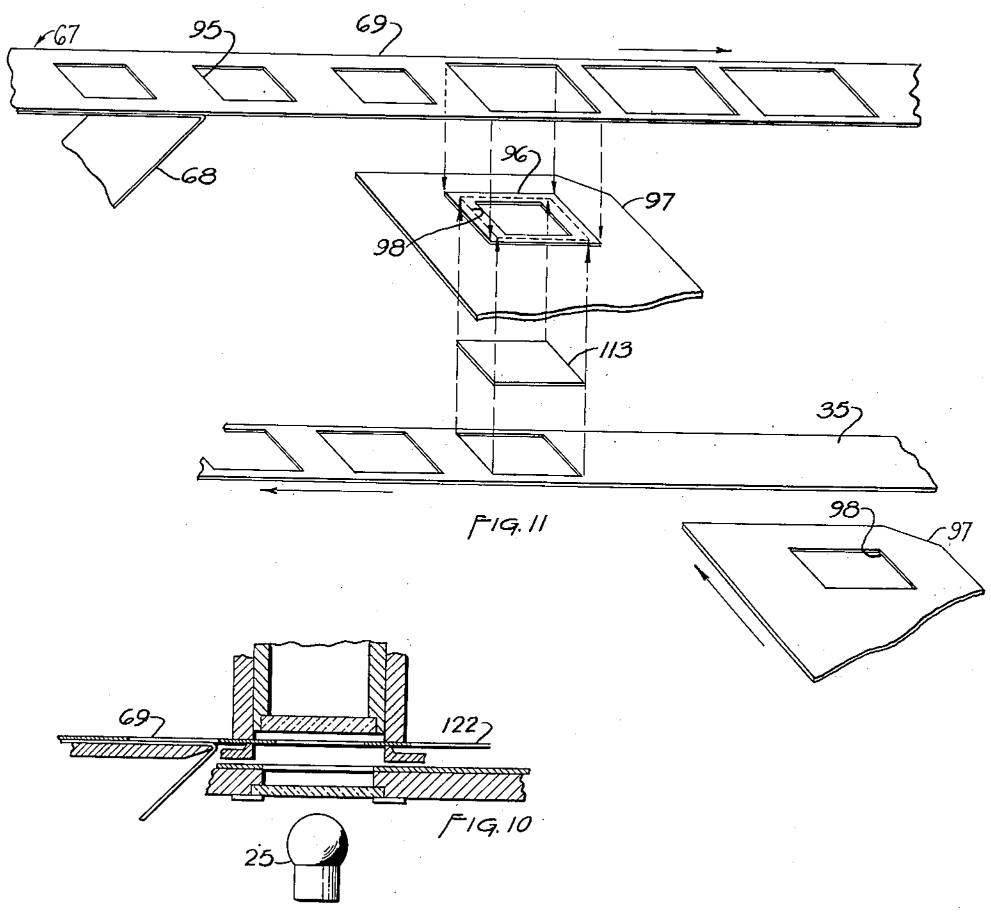
Figs. 9 and 10 illustrate diagrammatically still another method and apparatus, respectively, adapted to punch out glassine frames and mount the same.
Fig. 11 is a diagrammatic view showing a method of punching out glassine frames and microfilm exposures and mounting the same on a statistical card.

In operation, the apparatus thus described functions as follows: The housing 45 is pivoted upwardly and rearwardly to provide access to the upper and lower dies. The tape 67, backing 68 and glassine 69 are threaded through the apparatus as described. As illustrated in Fig. 11, the glassine strip or layer 69 is provided with pre-cut rectangular openings 95. The knob 78 is turned until an opening 95 is registered with the upper die opening 51. Meanwhile, of course, the lamp 25 will be lighted to facilitate viewing the die openings. The microfilm 35 is threaded through the guide throat 20 and between the rolls 37 and 38 until the first exposure is in precise registry with the lower die opening 18. The housing 45 is then pivoted back into operative position and is clamped in place by means of set screws 47. The operator will then depress the handles 57 of actuator member 56, thus causing the upper die 48 to descend, punch out a frame 96 from the glassine strip 69, and press the frame against a statistical card 97. The card 97 is formed with a rectangular die-cut opening 98, and this opening is registered with the die openings 18 and 51 by means of guide strips 110, 111 and 112. The frame 96 will thus be mounted on the card 97 in registry with the die-cut opening 98. When the upper die 48 has thus been depressed to its limit, the handles 57 will be given a slight turn so as to engage them with the horizontal slots 59 formed in the housing 45, thus latching the upper die 48. The next operation consists of depressing the lever 33, thus causing rotation of the arm 30 in a counter-clockwise direction, as viewed in Fig. 1. This will cause upward movement of the lower die 14 and will punch out an exposure 113 from the strip of microfilm 35. The exposure will be carried upwardly through the lower die opening 18 and will be mounted on the glassine frame 96. The operator will then release the lever 33, whereupon the compression springs 29 will return the lower die 14 to its lowermost, inactive position, and the operator will also turn the handles 57 to unlatch the actuator member 56, thus allowing compression spring 54 to return the upper die 48 to its uppermost inactive position. The operator will then withdraw the statistical card from the apparatus, which will be in readiness for the next cycle of operations. A complete cycle of operations is illustrated diagrammatically in Fig. 11.

Figure 6:
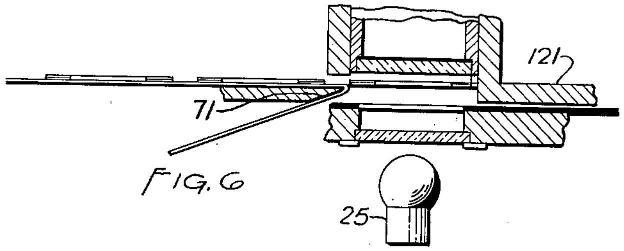
Figs. 5 and 6 are diagrammatic views showing method and apparatus, respectively, used in mounting pre-formed frames of glassine on statistical cards.
Figure 5:
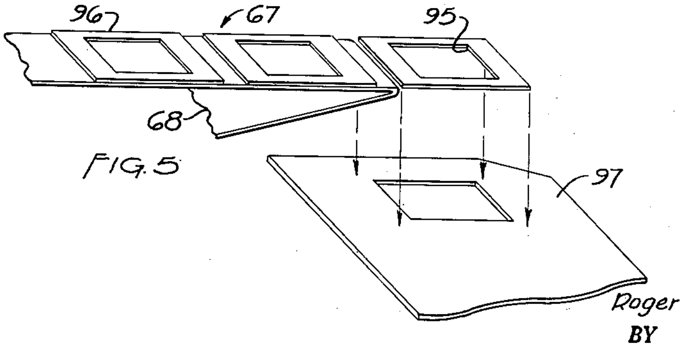

Referring now to Fig. 5, there is shown a tape 67 comprising a layer of backing 68 to which are adhesively secured pre-cut frames 96 of glassine, each such frame having a pre-cut rectangular opening 95 formed therein. A simplified form of apparatus adapted to carry out the method illustrated in Fig. 5 is shown in Fig. 6. Parts which are identical with those in Fig. 1 are identically numbered. In this form of apparatus a take-up reel for the ladder of waste glassine is unnecessary, and it will be noted that a backstop or guide member 121 is provided. As will also be seen, the stripper blade 71 is disposed close to the die opening 51 to insure proper feeding of the pre-cut frames to the die.

Figure 8:
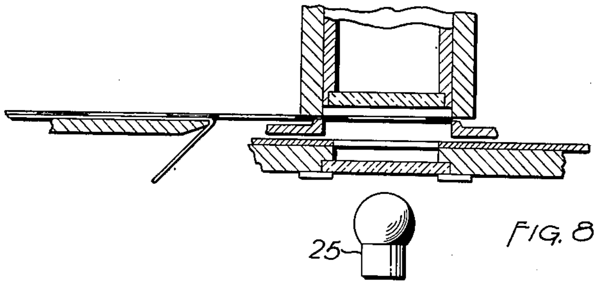
Figs. 7 and 8 are likewise diagrammatic views illustrating method and apparatus, respectively, adapted to punch out glassine frames and mount the same.
Figure 7:
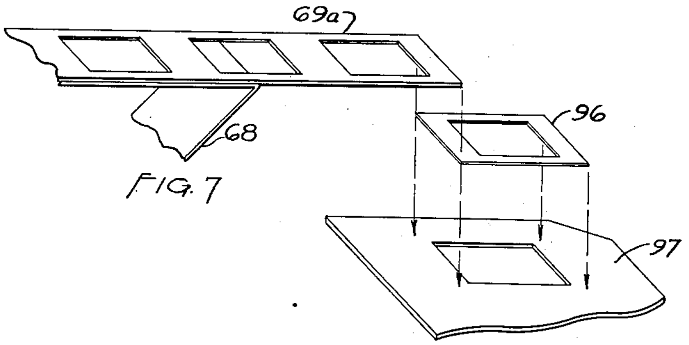

Referring to Figs. 7 and 8, there are shown a method and an apparatus similar to that shown in Figs. 5 and 6. However, a continuous strip of glassine 69*a* is provided, and frames 96 are punched from the strip without waste. Accordingly, no take-up reel is required.

Figure 9:
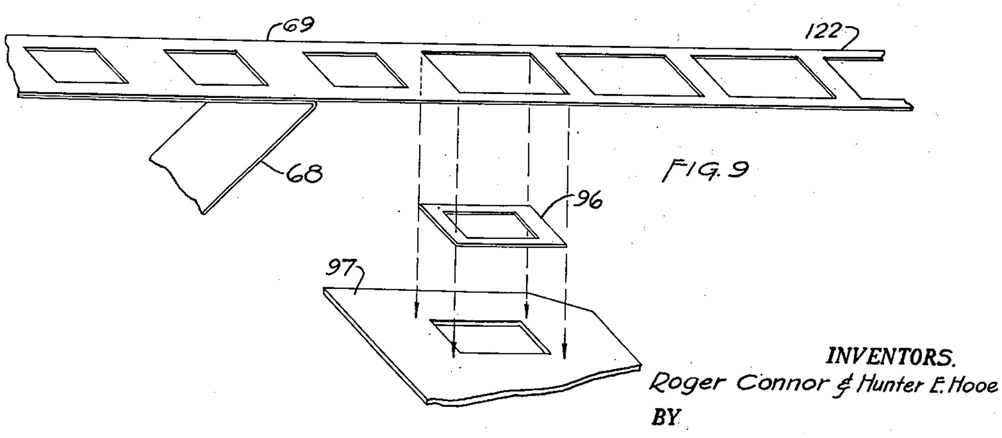

Referring now to Figs. 9 and 10, there are shown a method and an apparatus for punching glassine frames 96 from a continuous strip 69. The strip is such as to produce a ladder 122 of waste material. Obviously, the apparatus requires a take-up reel such as the take-up reel 77 illustrated in Figs. 1 and 2.

Fig. 11 shows a complete sequence of operations such as carried out with the apparatus of Figs. 1 to 4 described above. Thus, a statistical card 97 having a pre-cut die opening 98 is provided. Beneath the same is provided a strip 35 of microfilm. Above the card 97 is provided a strip 69 of glassine having pre-cut openings 95 formed therein. A frame 96 of glassine is punched from the strip 69 and is mounted on the card. An exposure 113 of microfilm is punched from the strip 35 and is mounted on the frame 96.

It will, of course, be apparent that the apparatus and method thus described are applicable to other operations than mounting microfilm exposures. Thus, frames 96 of adhesive-coated glassine may be punched from a strip 69 and mounted on cards 97 in registry with die-cut openings 98, as described hereinabove. If it is desired to keep an inventory of the framed cards or blanks and to mount microfilm exposures at a later time, it is desirable to protect the glassine frames 96 from damage and to prevent the adhesive from sticking adjacent cards together. This object can be accomplished by mounting glassine plugs similar to the microfilm exposures 113 on the frames, and then punching these plugs out when it is desired to mount microfilm. The apparatus and method described hereinabove are adapted to provide such an inventory of blanks, merely by substituting a strip or tape of glassine for the microfilm 35.

It is thus apparent that an apparatus has been provided which is operable to perform one or several of a sequence of operations. Thus, in its simplest form, it is adapted to transfer individual, pre-cut frames of adhesive-coated glassine from a tape to die-cut, statistical cards or the like so as to provide a means for mounting microfilm thereon. In other forms, it is adapted to punch out individual frames of adhesive-coated glassine from a continuous strip thereof and to mount each individual frame on a statistical card in precise registry with a die-cut opening formed therein. In still another embodiment, a continuous strip of adhesive-coated glassine material having pre-cut openings formed therein is punched to produce individual frames, each individual frame is mounted upon a statistical card in precise registry with a die-cut opening formed therein, and individual microfilm exposures or protective plugs are punched from a strip of microfilm or protective glassine and each exposure or plug is mounted upon a frame.

It is, therefore, apparent that a form of apparatus and a mode of operation are provided which are advantageous in many respects and are flexible and easily adapted to a variety of purposes; that the apparatus is simple and easily operable, either manually or automatically; and that the method itself is simple and easy to follow and requires no high degree of skill. It is further apparent that the apparatus provided is capable of performing a multiplicity of operations at a single station, thus simplifying operation, making higher speeds possible, and rendering the operation continuous.

While we have shown the preferred forms of our invention, it is to be understood that various changes may be made in its construction by those skilled in the art without departing from the spirit of the invention as defined in the appended claims.

Having thus described our invention, what we claim and desire to secure by Letters Patent is:

1. A mounting machine adapted for cutting and mounting selected portions of film on cards within openings formed therein comprising: first and second female dies; means for holding said dies in opposed, parallel, slightly spaced relation with respect to each other, the die opening of said first die being identical in size to the openings in said cards and smaller than the die opening of said second die, and the opposed faces of said dies defining a slot for the accommodation of one of said cards with its opening in registration with the die opening of said first die; a first male die mounted over the outer face of said first female die and in registration with the opening therein, said first male die being normally spaced from said first female die to permit the insertion of a selected portion of a film therebetween; a second male die mounted over the outer face of said second female die in registration therewith and slightly spaced therefrom so that a strip of adhesive can be inserted therebetween; and means for advancing said male dies into and through their associated female dies.

2. A machine such as defined in claim 1 wherein said first and second male dies are outwardly biased by springs associated therewith.

3. A mounting machine adapted for cutting and mounting selected portions of film on cards within openings formed therein comprising: first and second female dies; means for holding said dies in opposed, parallel, slightly spaced relation with respect to each other, the die opening of said first die being identical in size to the openings in said cards and smaller than the die opening of said second die, and the opposed faces of said dies defining a slot for the accommodation of one of said cards with its opening in registration with the die opening of said first die; a first male die mounted over the outer face of said first female die and in registration with the opening therein, said first male die being normally spaced from said first female die to permit the insertion of a selected portion of a film therebetween; a second male die mounted over the outer face of said second female die in registration therewith and slightly spaced therefrom so that a strip of adhesive can be inserted therebetween; means for advancing said male dies into and through their associated female dies; and means for locking said second male die within said second female die with their outer edges flush with each other.

4. A mounting machine adapted for cutting and mounting selected portions of film on cards within openings formed therein comprising: a base member; first and second female dies; means for mounting said dies on said base member in opposed, parallel, slightly spaced relation with respect to each other, the die opening of said first die being identical in size to the openings in said cards and smaller than the die opening of said second die, and the opposed faces of said dies defining a slot for the accommodation of one of said cards with its opening in registration with the die opening of said first die; a first male die mounted over the outer face of said first female die and in registration with the opening therein, said first male die being normally spaced from said first female die to permit the insertion of a selected portion of a film therebetween; a male die holder hinged to the said base member in registration with said second female die and slightly spaced therefrom so that a strip of adhesive can be inserted theregetween; a second male die mounted within said male die holder; means for locking the free end of said die holder to said base member and means for locking said second male die within said die holder with its outer face flush with the outer face of said second female die.

ROGER CONNOR.
HUNTER E. HOOE.

REFERENCES CITED

The following references are of record in the file of this patent:

UNITED STATES PATENTS

| Number | Name | Date |
|---|---|---|
| 1,692,387 | Schmitt | Nov. 20, 1928 |
| 1,763,109 | Strobl | June 10, 1930 |
| 1,968,881 | Edwards | Aug. 7, 1934 |
| 2,033,736 | Perryman | Mar. 10, 1936 |
| 2,294,159 | Calabro | Aug. 25, 1942 |
| 2,304,852 | Sharples | Dec. 15, 1942 |
| 2,338,189 | Libby et al. | Jan. 4, 1944 |
| 2,367,189 | Avery | Jan. 16, 1945 |
| 2,437,022 | Fritzinger | Mar. 2, 1948 |
| 2,493,159 | Morrison | Jan. 3, 1950 |
| 2,555,218 | Bailey | May 29, 1951 |